United States Patent
Misarek et al.

[15] 3,668,839
[45] June 13, 1972

[54] AIR POLLUTION CONTROLLER

[72] Inventors: Joseph Misarek, Oodstock; William W. Jaxheimer, Kingston, both of N.Y.

[73] Assignee: Combustion Control Devices, Paterson, N.J.

[22] Filed: May 28, 1971

[21] Appl. No.: 148,190

Related U.S. Application Data

[63] Continuation of Ser. No. 758,445, Sept. 9, 1968, abandoned.

[52] U.S. Cl. ..............................................55/223, 23/277 C
[51] Int. Cl. ......................................B01d 47/12, B01j 6/00
[58] Field of Search.......................55/80, 84, 89, 90, 93, 94, 55/222, 223, 228, 257; 23/277 C

[56] References Cited

UNITED STATES PATENTS

| | | | |
|---|---|---|---|
| 3,322,508 | 5/1967 | Ungerleider | 23/277 C |
| 3,487,620 | 1/1970 | Klein et al | 55/222 |

*Primary Examiner*—Charles N. Hart
*Attorney*—Joseph J. Connerton

[57] ABSTRACT

A system for sequential removal of various air pollutants or contaminants such as fly ash, chemicals and hydrocarbons from exhaust systems consists of a series of afterburning, steam, fog, spray and washing chambers which remove toxics, hydrocarbons, fly ash and other undesirables before the fumes are emitted to the atmosphere. The sulfides or other chemicals removed during this process are placed in water solution which can be further refined, reclaimed, neutralized or disposed of.

7 Claims, 2 Drawing Figures

PATENTED JUN 13 1972  3,668,839

INVENTOR
JOSEPH R. MIZEREK
WILLIAM W. JAXHEIMER

BY

ATTORNEY

AIR POLLUTION CONTROLLER

This application is a continuation of Ser. No. 758,445 filed Sept. 9, 1968 and now abandoned.

BACKGROUND OF THE INVENTION

One of the basic problems affecting modern society which is particularly prevalent in urban and highly industrialized areas relates to air pollution from exhaust systems such as incinerators, foundries, power generators, processing plants, etc. This pollution may take the form of smoke, fly ash, hydrocarbons, various toxic or non-toxic chemicals or any combination thereof depending on the industry or process involved. For example, one primary source of air pollution is waste disposal, which after education and public roads, represents the third highest ranking municipal expenditure in the United States. The two primary methods of waste disposal at present are sanitary land fills and municipal incineration. As land fill projects become completed and suburbs push further into the countryside, the land available for burying refuse in sanitary land fills diminishes, and transportation of the refuse over ever increasing distances becomes impractical. Thus the trend for the present and foreseeable future points toward incineration, with possible reclamation of the residue, as the main means of waste disposal. However, conventional incinerators increase the air pollution by discharging pollutants resulting from incineration directly into the atmosphere. The problem of air pollution control, particularly in urban areas, has reached a critical stage, and pollution control systems are being mandated by Federal, state and local regulations culminating in the 1967 Federal air pollution legislation. However, this problem presents a further dilemma because none of the conventional exhaust suppression systems are able to abate all contaminants. Partially because of this, most states and municipalities lack codes that specify the amount of "permissive" dust or residue that can be emitted. The result is that specifications for pollution control are either delayed, changed or not enforced, thus further contributing to the air pollution problem. Finally, the conventional air pollution systems, despite their inefficiencies, require a heavy financial investment thereby substantially increasing the cost of all manufactured devices. Smoke arresters are known in the art which will remove smoke from varied industrial and commercial applications. However, merely reducing visible smoke does nothing toward eliminating colorless gases or other pollutants. Similarly, water washdown systems have been employed in the art for the removal of fly ash. However, the efficiency required of various types of heating systems as well as various commercial heating facilities and plants is such that a significant amount of hydrocarbon, which constitutes one of the primary elements of air pollution, escapes. The final factor involved in air pollution relates to various toxic chemicals which may be in the form of invisible gases which are emitted by heating systems, power or steam generating systems, or any system using pollutant containing fuels. Despite the known need for pollution control, there are no known systems capable of removing all sources of air pollution prior to discharge of the exhaust into the atmosphere.

FIELD OF THE INVENTION

This invention relates to an air pollution control system and more particularly to an air pollution control system which is readily adaptable to all systems generating smoke, fly ash, toxic vapors, hydrocarbons, chemicals, pollutants, and for removal and/or reclamation of same.

SUMMARY OF THE INVENTION

In accordance with the present invention, there is provided apparatus capable of removal of all contaminants from a pollution generating system. The invention includes afterburner chambers to dispose of hydrocarbons, steam chambers and water scrubbing and fogging chambers arranged in a particular sequence to eliminate the fly ash and chemical pollutants. The invention may include the optional condenser for prevention of steam discharging into the atmosphere, or alternatively may discharge pure steam directly into the atmosphere. Finally, the chemicals removed by the present invention may be selectively reclaimed in the form of water solutions such as sulfuric acid in the case of sulfur.

Accordingly, a primary object of the present invention is to provide an improved air pollution control system.

Another object of the present invention is to provide an improved method of air pollution control.

Another object of the present invention is to provide pollution control apparatus which can be readily attached to existing air pollution systems.

Still another object of the present invention is to provide an improved air pollution control device which can be integrated into newly designed or existing boilers or incinerators or air handling systems that generate pollutants.

A further object of the present invention is to provide an improved system for removing generated contaminants and pollutants from air polluting systems.

Another object of the present invention is to provide an economical method for reclaiming selective chemicals from fuels or various manufacturing or refining processes.

Another object of the present invention is to provide an improved system which permits the usage of low cost fuel without emission of heavy concentrations of smoke, fly ash, and sulfide.

Another object of the present invention is to provide an improved flexible system which is readily adapted to air handling systems of various sizes and configurations using various embodiments of the invention and the addition of chemical additives.

DRAWINGS

The foregoing and other objects, features and advantages of the invention will be apparent from the following more particular description of a preferred embodiment of the present invention, as indicated in the accompanying drawings, in which.

DETAILED DESCRIPTION OF THE INVENTION

Figure 1:
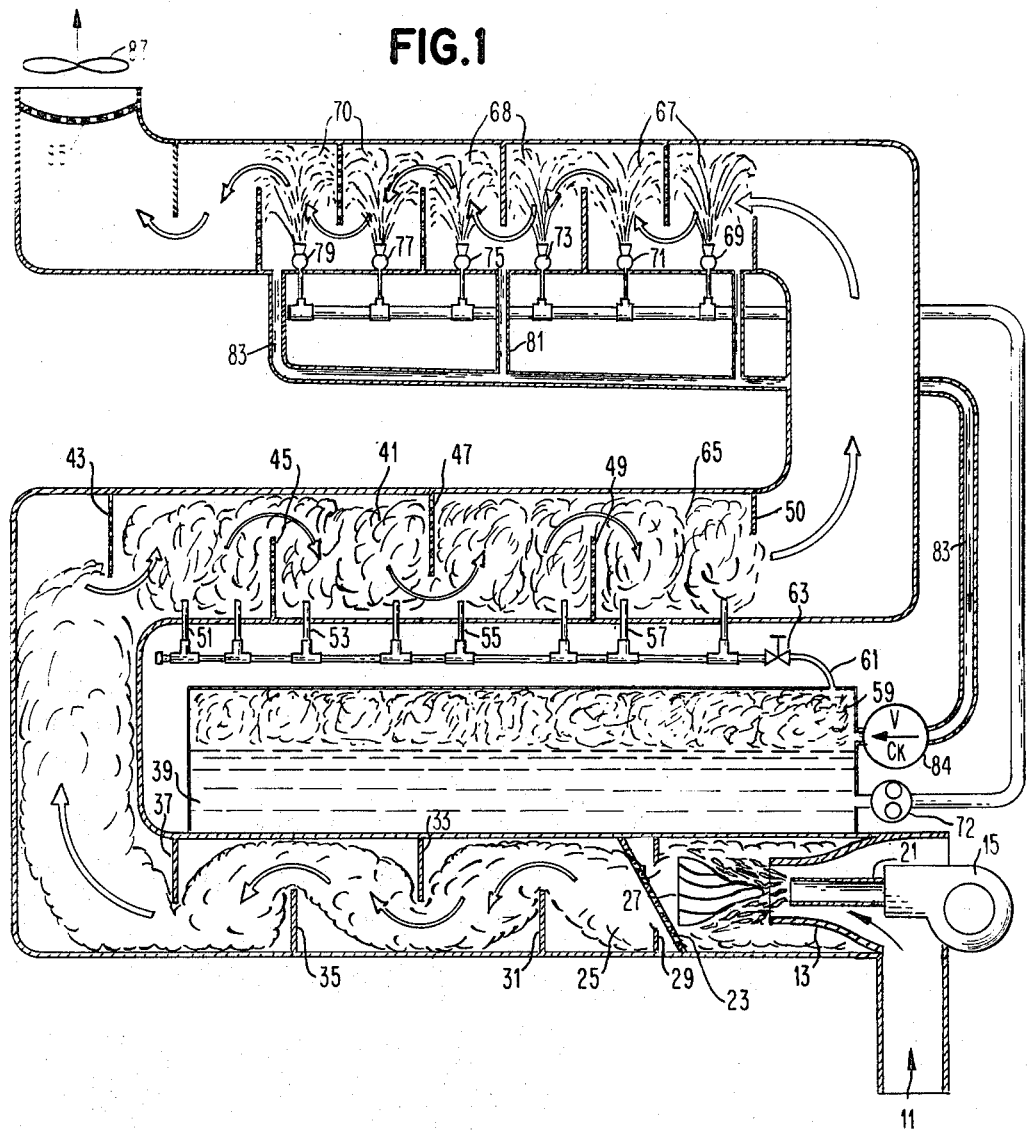
FIG. 1 illustrates a schematic flow diagram of a preferred embodiment of the present invention.
Figure 2:
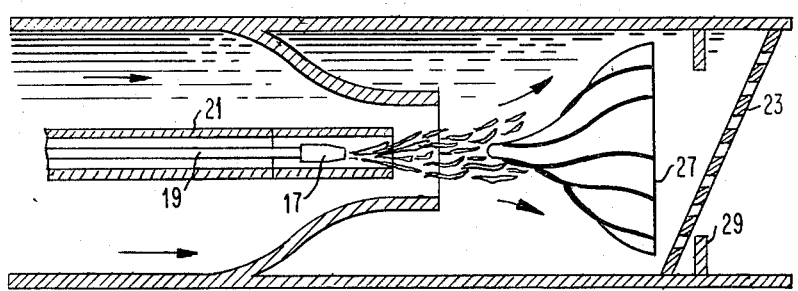
FIG. 2 illustrates a detail view of the mixing venturi shown schematically in FIG. 1.

Referring now to the drawings and more particularly to FIG. 1 thereof, the overall system of a preferred embodiment of the instant invention is shown in schematic flow form. Since the invention is designed for attachment to existing pollutant generating systems, the means for generating the flue gases is not considered a part of the instant invention and has accordingly been omitted from the drawings in the interest of clarity. The flue gases enter through input port 11 to venturi 13, where they are mixed with the burning gases from burner 15. As more fully shown in FIG. 2, burner 15 includes a gas jet 17 supplied by gas line 19, although other conventional burners or fuels could be employed. Burner 15 also includes a forced air blower which applies forced air through air tube 21 to venturi 13. At the discharge end of venturi 13, a perforated sheet 23 of expanded metal is employed to assist in maintaining a high and uniform temperature within the afterburner chamber 25. In the preferred embodiment of the present invention herein described, the temperature of the afterburner chamber is normally maintained within a range of 1,500°–1,900° fahrenheit, although higher temperatures may be employed in treating special gases.

The output from the venturi 13 is applied to a fluted cone 27, the output end of which is positioned near baffles 29. The combination of the burner, forced air blower, the perforated sheet at the discharge end of the venturi, the fluted cone and baffle arrangement causes agitation and swirling of the burning gases as they enter and progress through the afterburner chambers. This agitation of the flue gases is maintained through the various compartments of afterburner chambers 25, as indicated by the flow through the alternate lower and upper baffles 31, 33, 35, 37, producing substantially complete combustion of the hydrocarbons contained in the flue gases and burner gases. Thus the initial contaminants, hydrocarbons, are removed in the afterburner chamber. In the preferred embodiment herein described, the heated afterburner chamber is also used to heat water and generate steam in water tank 39, both of which are utilized in a manner more fully described hereinafter, although any source of hot water and steam may be employed. Also, the size and shape of the afterburner chamber and the number and size of baffles will vary directly with the size of the installation and the quantity of flue gases to be treated.

Since the hydrocarbons have been virtually eliminated in the afterburner, the flue gases leaving the afterburner chamber now contain smoke, fly ash, and chemical constituents. As shown in FIG. 1, the gases next enter the steam chamber 41. The steam chamber 41, like the afterburner chamber 25, is divided into a number of compartments separated by baffles 43, 45, 47, 49, 51. Steam is provided within each compartment in the preferred embodiment by associated steam nozzles 51, 53, 55, 57 operated under pressure from steam source 59, and applied through line 61 and valve 63. As the flue gases progress through the individual compartments of the chamber, as indicated by the arrows, the individual particles of the flue gases become steam saturated, and the particles leaving compartment 65 are heavily steam saturated.

The final processes involve water scrubbing and fogging. The various gases being emitted from the steam chamber in saturation travel first into the two compartment fogging chamber 67, where a heavy fog is generated by fogging nozzles 69, 71. These nozzles emit a water fog at a temperature of 190° F which is provided from water tank 39 through pump 72 and water line 74. The difference between the temperature in the fogging chamber and that of the saturated gases entering the chamber, approximately 600°– 900° F, produces a precipitation, causing a fallout of approximately 60 – 70 percent of the remaining contaminants in the gas. These contaminants comprise the fly ash, any remaining unburned hydrocarbons and whatever chemicals may be contained within the gas. The remaining gases are washed in a series of fine mist chambers 68 having mist nozzles 73, 75, which continue the temperature at that provided by the fogging chambers causing additional fly ash contaminants and hydrocarbons to fall into solution. Those particles falling into solution are removed by the return lines 81, 83 having a check valve 84 in line 83 to control direction of flow to the hot water tank 39 where the temperature of the water, as previously described, is maintained by direct contact with the afterburner chamber.

Finally, after passing through the fogging chamber and the fine mist chambers, the gases pass through spray chamber 70 in which a heavy spray from nozzles 77, 79 is used to wash down the remaining fly ash, to reduce the airborne moisture and to reduce the temperature of the flue gases leaving the stack. The fog, fine mist and heavy spray treatment causes the various contaminants in the gas to fall into solution and be returned to the water tank 39. Obviously after a certain period of time, the water in the closed loop water circulating system must be changed, depending on the degree of pollution in the exhaust gas. At the same time, the solution can be refined or elements in the solution reclaimed through conventional methods. If desired, a condensing unit 85 may be employed to prevent steam from discharging directly into the atmosphere. Since the discharge of pure steam into the atmosphere does not create a pollution problem, the condenser may not be required. An induced draft may be applied to the exhaust port by conventional means, either a motor driven blower or utilizing an existing stack, the draft being indicated by the symbol 87.

The preferred embodiment of the instant invention is primarily adapted for general purpose air pollution control for light industry, institutional incinerators, boilers, heating equipment, etc. Where the instant invention is designed for a specific application, individual treatments may be expanded or eliminated in accordance with the pollutants in the exhaust and their respective concentrations. Again, the size of the unit will vary with the size and complexity of the application and will function with the largest industrial or municipal complexes.

By means of the instant invention, the need for a high stack is eliminated, since its main function is to provide a high point to discharge gases into the atmosphere, providing an additional significant saving. The same method is employed for stackless roof type air pollution controllers, industrial air purifiers, air pollution controllers for kilns, cement plants, foundries and incinerators and smaller units for incinerators, stores, apartments and factories. The same principle is employed in larger embodiments designed for power generators or incinerators.

While the invention has been shown and described with reference to a preferred embodiment thereof, it will be understood by those skilled in the art that the foregoing and other changes may be made in the form and details of the invention without department from the spirit and scope of the invention, and it is the intent to be limited only by the claims.

What is claimed is:

1. Air pollution control apparatus for removing pollutants including hydrocarbons, smoke, fly ash, and chemical constituents from exhaust gases comprising in combination;

housing means incorporating a plurality of communicating chambers, means including an afterburner chamber connected to the inlet of said housing means for removing a first pollutant from said exhaust gases through high temperature combustion, steam vaporizing means having associated therewith means for introducing water and removing steam, a steam chamber connected to the outlet of said afterburner chamber, said steam chamber having steam supply means associated with said steam vaporizing means for saturating the remaining pollutant particles in said exhaust gases, condensation producing means connected to the outlet of interconnecting steam chamber for producing precipitation of said saturated pollutant particles, said condensation producing means comprising a plurality of interconnecting water spray stages having associated chambers, said interconnected water spray chambers operating at a temperature below that of said steam chamber whereby said remaining steam saturated contaminant particles are dropped into solution as they pass through said water spray stages, and means for controlling the passage of said exhaust gases through said communicating chambers in the above specified sequence.

2. Apparatus of the type claimed in claim 1 wherein said afterburner chamber includes a metallic perforated sheet to assist in maintaining a high and uniform temperature within said afterburner chamber.

3. Apparatus of the type claimed in claim 2 wherein said afterburner chamber further comprises a fluted cone and baffle arrangement to increase agitation of the swirling gases as they enter and progress through the afterburner chamber.

4. Apparatus of the type claimed in claim 1 wherein said interconnected water spray chambers comprise water fogging and washing chambers for producing condensation of said steam saturated particles.

5. Apparatus of the type claimed in claim 1 further including conduit means connecting the outlet from said precipitation producing means to said steam vaporizing means in a closed loop circulating system.

6. Air pollution control apparatus for removing a plurality of contaminants from exhaust gases prior to discharge of said exhaust gases into the atmosphere comprising in combination, housing means incorporating a plurality of pollutant removal stages positioned in associated compartments in a predetermined sequence, means for producing substantially complete combustion of said exhaust gases to remove a first contaminant, said means including connected burner and afterburner stages having inlet and outlet means, steam vaporizing means having associated therewith means for introducing water and removing steam, a steaming medium connected to said outlet means said steaming medium having steam supply means associated with said steam vaporizing means for saturating particles including the remaining contaminants in said exhaust gases, means connected to said steaming medium for precipitating said saturated contaminant particles into solution by passing said exhaust gases through a water spray medium, said water spray medium operating at a temperature lower than that of said steaming medium whereby condensation of said saturated contaminant particles is produced, and means connected to the outlet of said water spray medium for discharging said treated exhaust gases into the atmosphere.

7. Air pollution apparatus of the type claimed in claim 6 wherein said water spray medium comprises communicating water fogging and scrubbing chamber stages connected between the outlet of said steam chamber and said means for discharging said treated exhaust gases into the atmosphere.

* * * * *